(12) United States Patent
Willis

(10) Patent No.: US 8,164,760 B2
(45) Date of Patent: Apr. 24, 2012

(54) METHOD AND SYSTEM FOR INTERROGATING THE THICKNESS OF A CARBON LAYER

(75) Inventor: Terrance J. Willis, Campbell, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 239 days.

(21) Appl. No.: 12/722,335

(22) Filed: Mar. 11, 2010

(65) Prior Publication Data
US 2011/0222180 A1   Sep. 15, 2011

(51) Int. Cl.
*G01B 11/28* (2006.01)
(52) U.S. Cl. .......................... 356/630; 356/301
(58) Field of Classification Search .......... 356/301, 356/630; 250/559.27
See application file for complete search history.

(56) References Cited

U.S. PATENT DOCUMENTS

| | | | |
|---|---|---|---|
| 5,273,788 A | 12/1993 | Yu | |
| 5,994,035 A | 11/1999 | Tsukamoto et al. | |
| 6,046,758 A | 4/2000 | Brown et al. | |
| 6,081,328 A * | 6/2000 | Eng | 356/301 |
| 6,447,652 B1 | 9/2002 | Amano et al. | |
| 6,490,136 B1 | 12/2002 | Ito et al. | |
| 6,504,294 B1 | 1/2003 | Mahoney et al. | |
| 6,913,780 B2 | 7/2005 | Kato et al. | |
| 6,956,658 B2 | 10/2005 | Meeks et al. | |
| 7,537,846 B2 | 5/2009 | Ishiyama et al. | |
| 7,582,868 B2 | 9/2009 | Jiang et al. | |
| 2005/0089648 A1 | 4/2005 | Yamazaki et al. | |
| 2006/0077593 A1 | 4/2006 | Ueda | |
| 2009/0185193 A1 | 7/2009 | Munteanu et al. | |

FOREIGN PATENT DOCUMENTS
WO   2008/099394 A2   8/2008

OTHER PUBLICATIONS

Ewen Smith, et al., "Modern Raman Spectroscopy—A Practical Approach", John Wiley & Sons, Ltd., (ISBN 0-471-49794-0), Reprinted May 2006, Section in Chapter 5 entitled "Application of SERS", pp. 122-126.

* cited by examiner

Primary Examiner — Roy M Punnoose

(57) ABSTRACT

A method and system for interrogating a thickness of a carbon layer are described. The carbon layer resides on at least one of a magnetic recording head and a magnetic recording disk. The method and system include providing an enhancement film on the carbon layer. The enhancement film is continuous across a portion of the carbon layer. The method and system also include exposing the enhancement film to light from a light source and detecting scattered light from the carbon layer to provide a surface enhanced Raman spectroscopy (SERS) spectrum. The enhancement film resides between the light source and the carbon layer. The method and system also include determining the thickness of the carbon layer based on the SERS spectrum.

19 Claims, 5 Drawing Sheets

METHOD AND SYSTEM FOR INTERROGATING THE THICKNESS OF A CARBON LAYER

BACKGROUND

FIG. 1 depicts a portion of the conventional disk drive 10. The conventional disk drive includes a carbon layer 14 and underlying substrate 12. For example, the substrate may be part of a slider 12. In addition, other structures may be fabricated on the slider 12. The slider 12 may include structures such as write transducer shields, read transducer shields, dielectric layers or other features not explicitly shown in FIG. 1. In such a case, the carbon layer 14 may be a diamond-like carbon (DLC) layer provided on the ABS of the slider 12. Alternatively, the carbon layer 14 may be a DLC layer on the surface of a disk 12.

Failure analysis is often desired to be performed on the conventional disk drive 10. As part of failure analysis, characteristics of the disk drive 10, particularly those which may contribute to failure or poor operation of the conventional disk drive 10, are investigated. For example, the wear of the conventional carbon layer 14 may be examined. In order to characterize wear and other features of the conventional disk drive 10, the thickness of the carbon layer 14 is desired to be experimentally determined.

FIG. 2 is a flow chart depicting a conventional method 50 for determining the thickness of a carbon layer, such as the carbon layer 14. For simplicity, some steps are omitted. The carbon layer 14 is exposed to light used for Raman spectroscopy, via step 52. Light scattered from the carbon layer 14 is detected and used provide a Raman spectrum, via step 54. Typically, the Raman spectrum includes one or more peaks around frequencies specific to the carbon layer 14. Based on the spectrum, the thickness, d, of the carbon layer 14 is determined, via step 56.

Although the conventional method 50 may be able to determine the thickness for some conventional disk drives 10, there may be drawbacks. Portions of the carbon layer 14 may be thinned due to wear. Although shown as having a single thickness in FIG. 1, the thickness of the carbon layer 14 may actually vary across the slider/disk 12. Further, for current generation disk drives, the carbon layer 14 may be thin. For example, portions of the carbon layer 14 may be less than or equal to twenty-five Angstroms thick. For carbon films that have such a thickness and reside on an AlOTiC slider, the substrate/slider may greatly affect the output signal used for Raman spectroscopy. As a result, conventional Raman spectroscopy using the method 50 may result in large peaks for which noise is a significant component and which provide little information about the carbon layer. Further, transitions between underlying structures, such as shield edges, may affect the intensity of scattered light and thus the Raman spectrum. As a result, determining the thickness of the carbon layer 14 may be difficult or impossible using conventional Raman spectroscopy.

Surface enhanced Raman spectroscopy (SERS) is a technique used in characterizing thin films. In SERS, a film may be deposited on a metal enhancement layer, such as Ag. The underlying metal enhancement layer may allow for an enhanced signal from the film to be characterized. However, in the context of a slider/disk 12, the carbon layer 14 is already deposited. Thus, it may not be possible to place a metal enhancement film under the carbon film to be characterized. Thus, conventional SERS may not be of assistance in characterizing the carbon layer 14. Accordingly, what is needed is an improved method for characterizing a carbon layer of a disk drive, for example on a slider or disk.

SUMMARY

A method and system for interrogating a thickness of a carbon layer are described. The carbon layer resides on at least one of a magnetic recording head and a magnetic recording disk. The method and system include providing an enhancement film on the carbon layer. The enhancement film is continuous across a portion of the carbon layer. The method and system also include exposing the enhancement film to light from a light source and detecting scattered light from the carbon layer to provide a surface enhanced Raman spectroscopy (SERS) spectrum. The enhancement film resides between the light source and the carbon layer. The method and system also include determining the thickness of the carbon layer based on the SERS spectrum

DETAILED DESCRIPTION OF THE PREFERRED EMBODIMENTS

Figure 1:
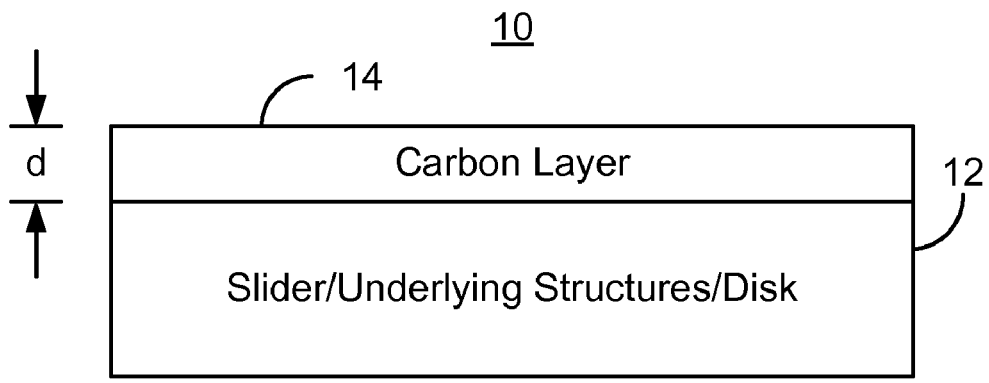
FIG. 1 is a diagram depicting a portion of a conventional disk drive.
Figure 2:
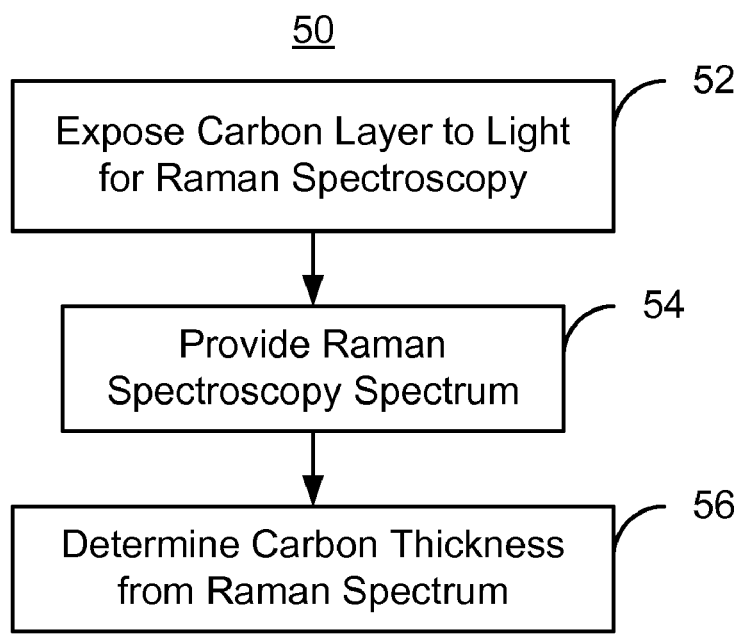
FIG. 2 is a flow chart depicting a conventional method for determining the thickness of a conventional carbon layer.
Figure 3:
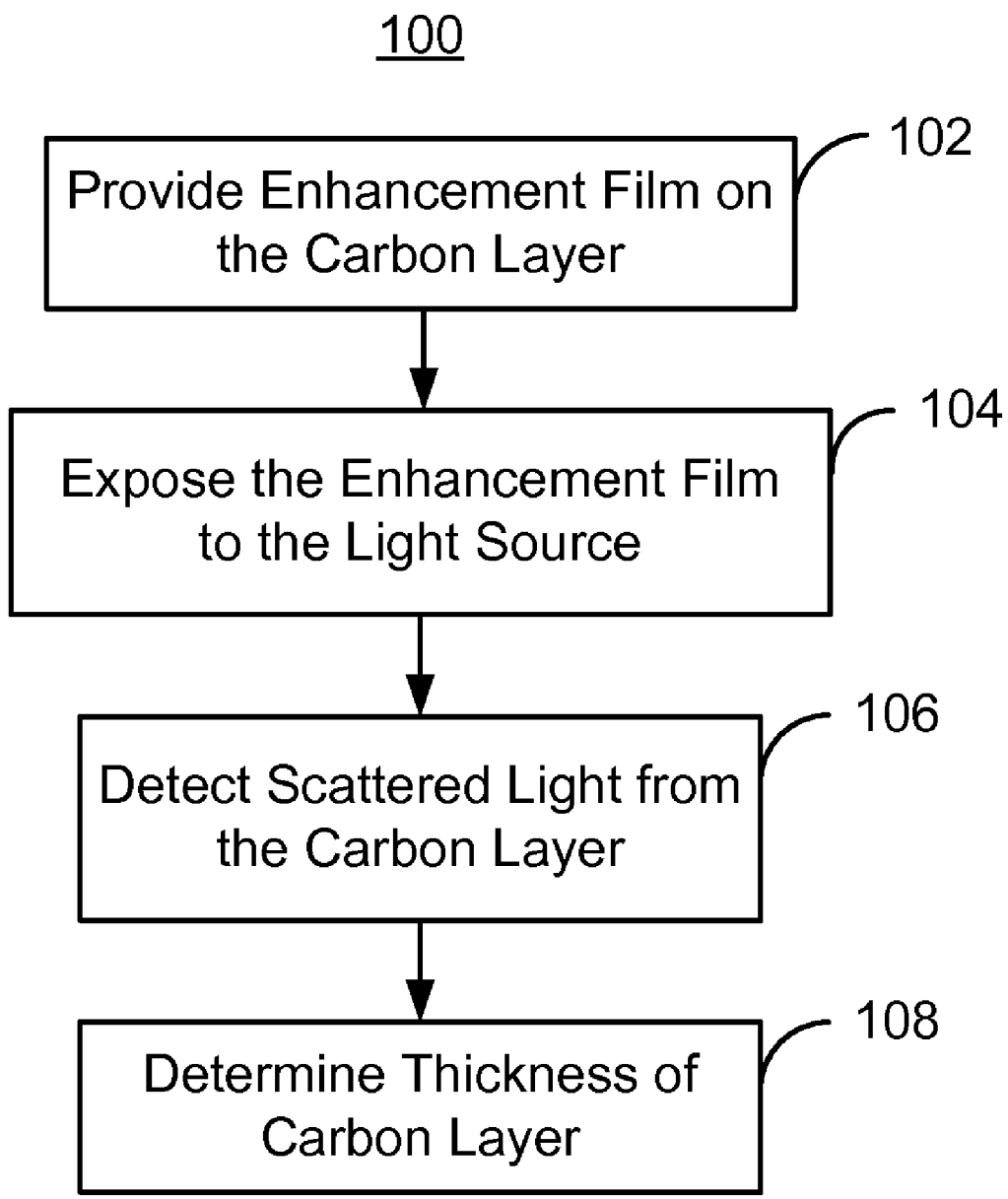
FIG. 3 is a flow chart depicting an exemplary embodiment of a method for determining the thickness of a carbon layer in a disk drive.

FIG. 3 is a flow chart depicting an exemplary embodiment of a method 100 for interrogating the thickness of a carbon layer. For simplicity, some steps may be omitted and/or combined. The carbon layer is used in a disk drive. For example, the carbon layer may be a DLC, nitride carbon, or other carbon overcoat layer on a slider. The carbon layer on the slider may reside on underlying structures. For example, portions of the carbon layer may be on the write shield, read shield, gap layers, insulating layers, or other structures of the read and/or write transducers. In other embodiments, the carbon layer may be a DLC or other carbon layer on a disk. The method 100 may find particular utility where the carbon layer is thin, for example not more than twenty-five Angstroms. In some such embodiments, the carbon layer has a thickness of not more than ten Angstroms. Further, in some embodiments, the carbon layer may have a thickness of five Angstroms or less. The carbon layer may also be discontinuous, having a zero thickness in some regions. However, the method 100 may be used with thicker layers. For example, in some embodiments, the carbon layer is not more than 150 Angstroms thick.

An enhancement film is provided on the carbon layer, via step 102. The enhancement film provided is continuous across the portion of the carbon layer for which thickness is to be determined. The enhancement film is configured to enhance the Raman signal from the underlying carbon layer. In some embodiments, therefore, the enhancement film provided in step 102 may include one or more of Au, Ag, Pd, Rh, Li, Na, and Pt. The enhancement film provided in step 102 may have a single constituent or be an alloy. In some embodiments, the enhancement film might be a multilayer. The enhancement film provided in step 102 is also desired to be thin. In some embodiments, the enhancement film has a thickness of not more than forty nanometers. In some such embodiments the enhancement film is not more than twelve nanometers thick. The enhancement film may also be at least one nanometer thick. Thus, the film provided in step 102 is continuous. In some embodiments, the enhancement film is at least five nanometers thick. Step 102 may include sputtering or otherwise depositing the enhancement film.

The enhancement film is exposed to light from a light source, via step 104. The enhancement film is between the light source and the carbon layer. The light source is generally a laser. For example, a 514 nm laser, a 532 nm laser and/or a 784 nm laser might be used. In some embodiments, the intensity of the light from the laser is attenuated. Less energy is then delivered to the enhancement film by the light. Less energy translates to a smaller possibility that the enhancement film will melt and become discontinuous across the surface of the carbon layer. Thus, the enhancement film may remain continuous during exposure to the light. However, in alternate embodiments, the enhancement film may be allowed to melt and form islands. Step 104 may include exposing different portions of the enhancement film.

Light scattered from the carbon layer is detected for the purposes of SERS, via step 106. Thus, the scattered light may be used to provide a SERS spectrum in step 106. Typically, the SERS spectrum includes one or more peaks around Raman frequency/wavelength shifts specific to the carbon layer. Further, step 106 may include collecting data from various portions of the carbon layer corresponding to different portions of the enhancement film being exposed to light in step 104. Multiple SERS spectra may thus be provided for different locations across the surface of a disk or slider. The thickness of the carbon layer is determined based on this spectrum, via step 108. Step 108 may include comparing data from different portions of the enhancement film/carbon layer. This may allow any signal from structures in the substrate underlying the carbon layer to account for. In some embodiments, steps 104-108 are used to interrogate portions of the carbon layer that are completely on an underlying structure. For example, the method 100 may be used to investigate parts of the carbon layer that are completely on a shield or completely on an underlying insulator. Step 108 may also include determining multiple thicknesses from multiple positions across the carbon layer.

Using the method 100, the thickness of the carbon layer may be determined. It is believed that surface Plasmon resonances in the enhancement film result in enhancements that are analogous to conventional SERS. These enhancements occur even though the enhancement film resides between the light source and the carbon layer. These enhancements allow the carbon layer under the enhancement film to be studied. SERS may thus be used to interrogate carbon layers already residing on structures in a magnetic recording disk drive. In some embodiments, enhancements in signals for the SERS spectrum of approximately an order of magnitude may be achieved. Further, it has been determined that the enhancements to the SERS signals may be particularly beneficial for enhancement film thicknesses on the order of five through twelve nanometers. In such embodiments, the enhancement in intensity is large and relatively constant with respect to variations in the enhancement film's thickness. Although there may be no upper limit on the thickness of the carbon layer with which the method may be used, the method 100 may find particular utility for thinner carbon films. In particular, the method 100 may allow for determination of the thicknesses of carbon films that are not more than twenty-five Angstroms thick. The thicknesses of such films may not be determinable using conventional Raman or conventional SERS spectroscopy. Further, using the method 100, the thickness of the carbon layer may be determined at multiple locations. Variations in the thickness of the carbon layer may, therefore, be ascertained. Wear of the carbon layer across the substrate may be investigated. Thus, use of the method 100 may enhance the ability to study and diagnose issues with carbon layers on sliders, disks or in other contexts within magnetic recording disk drives.

Figure 4:
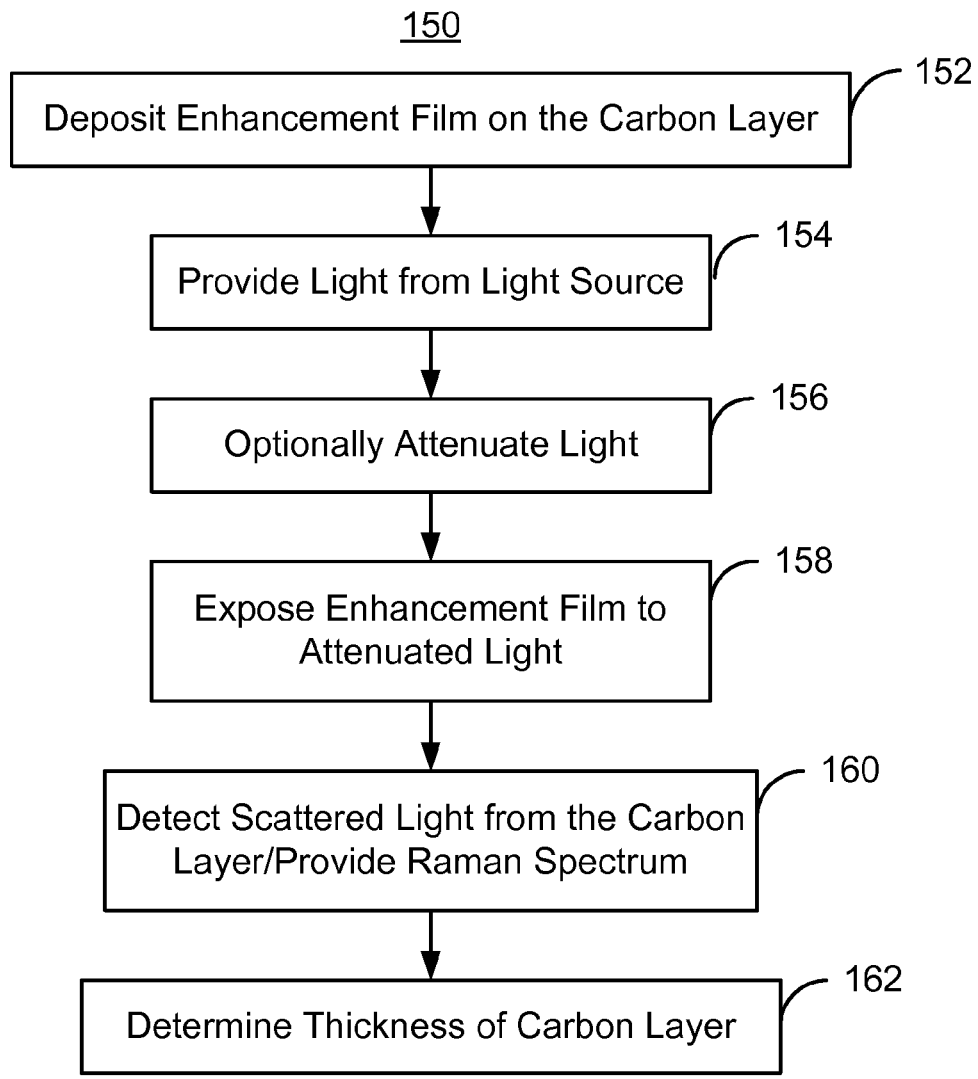
FIG. 4 is a flow chart depicting another exemplary embodiment of a method for determining the thickness of a carbon layer in a disk drive.
Figure 5:
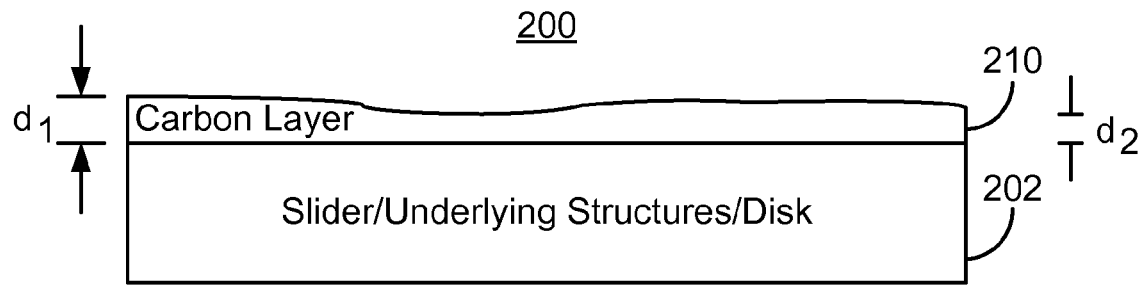
FIGS. 5-8 are diagrams depicting an exemplary embodiment of a portion of a magnetic recording disk drive having a carbon layer.

FIG. 4 is a flow chart depicting another exemplary embodiment of a method 150 for determining the thickness of a carbon layer in a disk drive. For simplicity, some steps may be omitted and/or combined. FIGS. 5-8 are diagrams depicting an exemplary embodiment of a portion of a magnetic recording disk drive 200 having a carbon layer. For simplicity, FIGS. 5-8 are not drawn to scale. The disk drive 200 is investigated using the method 150. Referring to FIGS. 4-8, the disk drive 200 includes a carbon layer 210 on a slider 202. The carbon layer 210 may be a DLC layer, nitride carbon layer, or other carbon overcoat layer. The carbon layer 210 generally resides on underlying structures (not shown in FIG. 5) formed on the slider 202. For example, portions of the carbon layer may be on the write shield, read shield, gap layers, insulating layers, or other structures of the read and/or write transducers. In other embodiments, the carbon layer may be a DLC or other carbon layer on a disk (not shown). The carbon layer 210 is shown as having a varying thickness, with a minimum of $d_2$ and a maximum of $d_1$. The variation in thickness may be due to wear of the carbon layer 210. Although a particular profile of the carbon layer 210 is shown, the thickness of the carbon layer 210 may vary in another manner. For example, the carbon layer 210 may have a constant thickness or may be discontinuous ($d_2=0$) in some regions. In some embodiments, $d_1$ is not greater than one hundred fifty Angstroms. In other embodiments, $d_1$ is not greater than twenty-five Angstroms. In other embodiments, $d_1$ may be not more than ten Angstroms. Further, in some embodiments, the carbon layer 210 may have a thickness of five Angstroms or less. Alternatively, the method 150 may be used with thicker layers.

Figure 6:
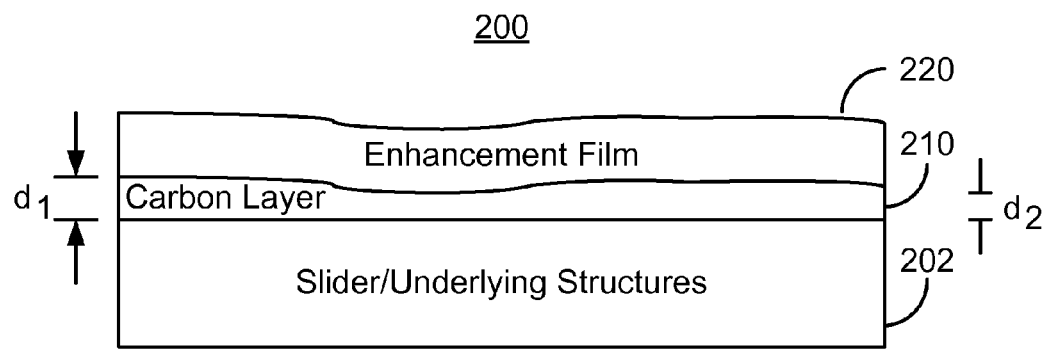
Figure 7:
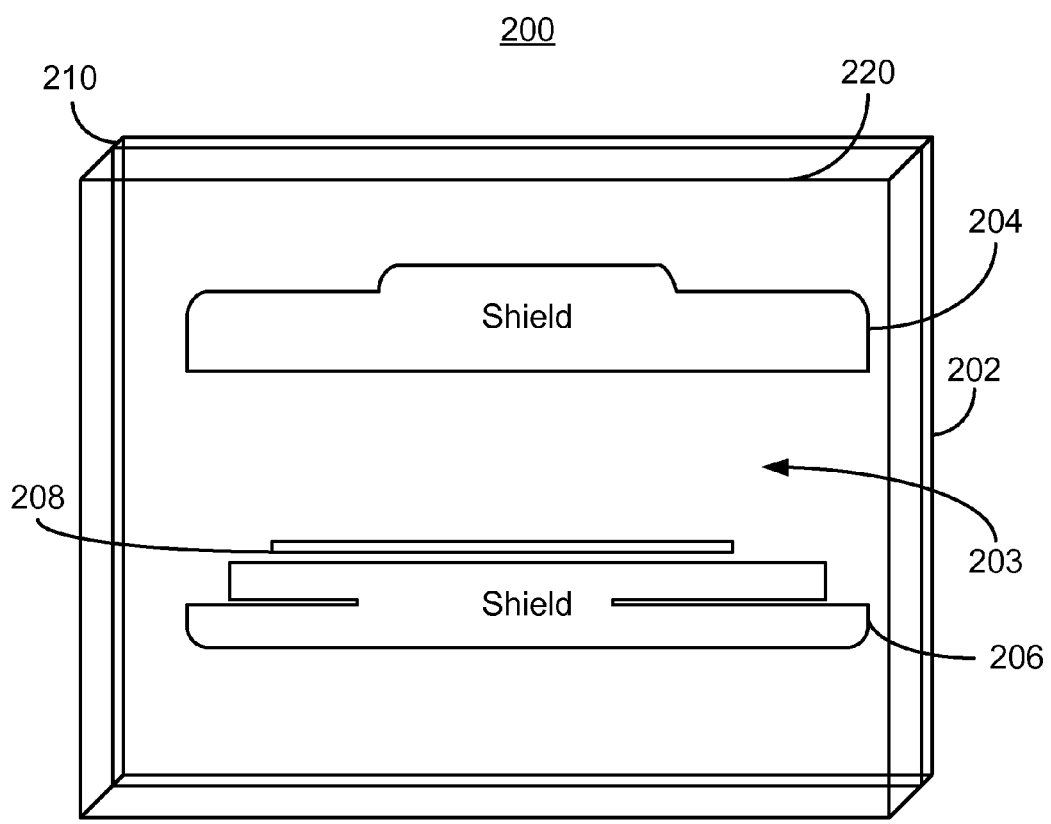

An enhancement film configured to enhance the Raman signal from the underlying carbon layer 210 is deposited on the carbon layer 210, via step 152. In some embodiments, step 152 may include sputtering or otherwise depositing a film containing one or more of Au, Ag, Pd, Rh, Li, Na, and Pt. The enhancement film deposited is continuous across the portion of the carbon layer for which thickness is to be determined. FIGS. 6-7 depict the magnetic recording disk drive after step 152 is performed. FIG. 6 depicts a side view, while FIG. 7 depicts a perspective view including underlying structures. The carbon layer 210 covers shields 204, 206 and 208, as well as insulator 203. The insulator 203 may include alumina, AlOTiC, or other material. The shield 204 may be a write transducer shield, while the shield 206 and 208 may be portions of a read transducer shield. An enhancement film 220 provided in step 152 is shown. In the embodiment shown, the surface of the enhancement film 220 generally follows the topology of the underlying carbon film 210. However, in other embodiments, the surface of the enhancement 220 may have a different topology than the underlying carbon film 210. In some embodiments, the enhancement film 220 has a thickness of not more than forty nanometers. The enhancement film 220 may also be at least one nanometer thick. In some embodiments the enhancement film 220 is at least five nanometers and not more than twelve nanometers thick. The enhancement film 220 is continuous. The enhancement film 220 may have a single constituent, be an alloy and/or a multilayer.

Figure 8:
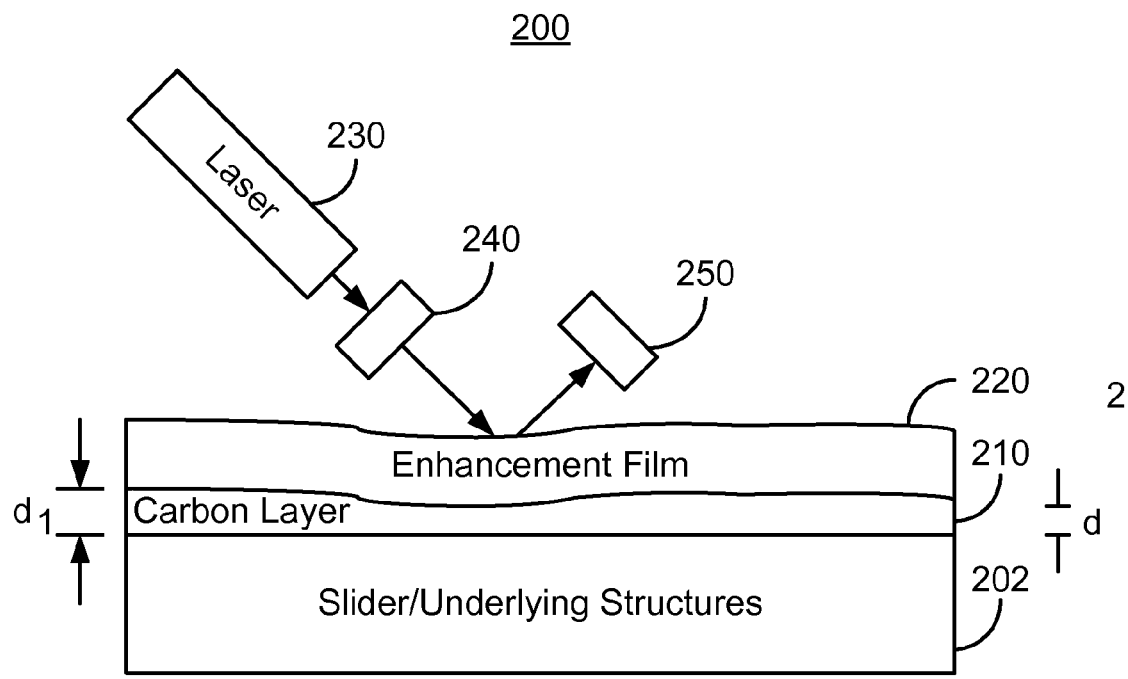

Light is provided from a light source, via step 154. The enhancement film is between the light source and the carbon layer 210. The light source is generally a laser. For example, a 514 nm laser, a 532 nm laser and/or a 784 nm laser might be used. The intensity of the light from the light source is optionally attenuated, via step 156. The enhancement film 220 is exposed to the (optionally attenuated) light, via step 158. Step 158 may include exposing different portions of the enhancement film. FIG. 8 depicts the magnetic recording disk drive during step 158. Thus, laser 230 and optional attenuator/filter 240 are shown. Light from the laser 230 may be attenuated to deliver less energy to the enhancement film 220, reducing the possibility that the enhancement film 220 melts and becomes discontinuous across the surface of the carbon layer 210. Thus, the enhancement film 220 may remain continuous during exposure to the light. However, in alternate embodiments, the enhancement film 220 may be allowed to melt and form islands.

Figure 9:
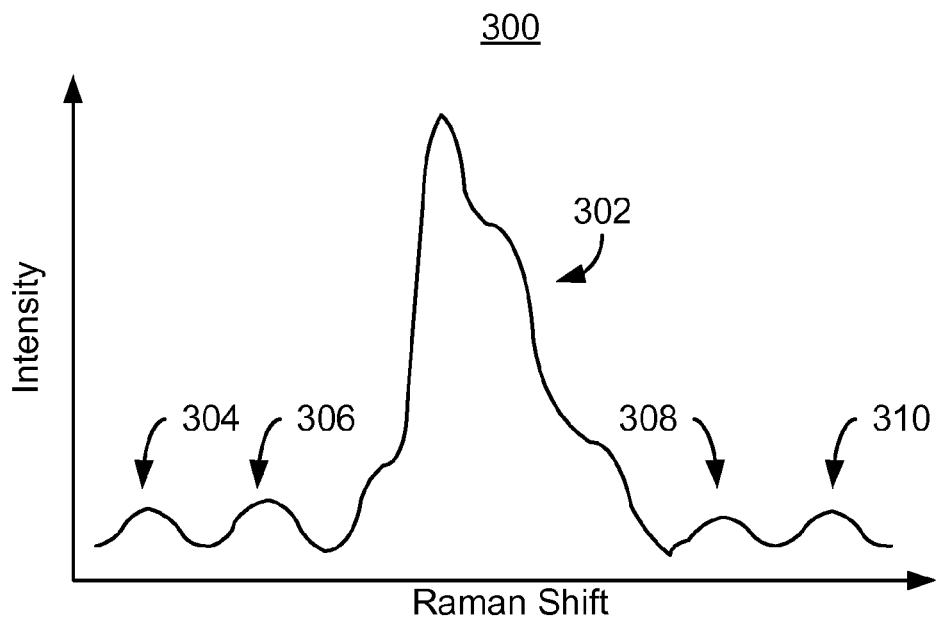
FIG. 9 depicts a SERS spectrum obtained using an exemplary embodiment of a method for determining the thickness of a carbon layer in a disk drive.

Light scattered from the carbon layer is detected for the purposes of SERS, via step 160. FIG. 8 also depicts the detector 250 used to collect light. Also in step 160, the scattered light detected by the detector 250 may be used to provide a SERS spectrum. Further, step 160 may include collecting data from various portions of the carbon layer 220 corresponding to different portions of the enhancement film being exposed to light in step 158. In some embodiments, steps 154-160 are performed for various locations across the carbon layer 210. Thus, spectra from various regions may be provided. For example, light from portions of carbon layer 210 above one or more of the shields 204, 206, and 208 or from portions of the carbon layer 210 above the insulator 203 may be detected and used to provide SERS spectra corresponding to these locations. FIG. 9 depicts a SERS spectrum 300 that might be obtained using the method 150. Note that the SERS spectrum 300 is for exemplary purposes only and is not intended to correspond to specific experimental results. The spectrum 300 indicates light intensity versus the shift in the wavelength of the light used. The SERS spectrum 300 includes one or more peaks around frequencies specific to the carbon layer. For example, the SERS spectrum 300 is shown as including primary peak 302, as well as additional peaks 304, 306, 308, and 310. In some embodiments, enhancements in signals for the SERS spectrum 300 of approximately an order of magnitude over conventional Raman spectroscopy may be achieved.

The thickness of the carbon layer 210 is determined based on the SERS spectra, via step 162. Step 162 may include using data from different portions of the enhancement film 220/carbon layer 210. In some embodiments, performance of the method 150 may improve in regions where the underlying structures are metallic, such as across much of the write transducer shield 204. In addition, edges of the underlying structures may 203, 204, 206, and 208 affect the SERS signal. Thus, the central portion of the read transducer shield 206 may provide a more reliable signal than its edges, where there may be transitions between structures 206, 208, and 203. Step 162 may include accounting for the signal due to the underlying structures 203, 204, 206, and 208 in the substrate 202. For example, changes in intensity due to the edges of the shields 204, 206, and 208 (transitions between shields 204, 206, and 208 and insulator 203) may be accounted for by comparing signals from different portions of the carbon layer 210 or using spectra only from particular areas. The use of SERS spectra corresponding to different portions of the carbon layer 210 may also allow the variations in thickness of the carbon layer 210 to be determined. For example, $d_1$, $d_2$, and thicknesses between $d_1$ and $d_2$ may be determined for their corresponding locations.

The method 150 is analogous to the method 100, and thus has similar benefits. In particular, the method 150 may allow for thicknesses of thin carbon films to be determined. For example, the method 150 may allow for determination of the thicknesses of carbon films that are not more than twenty-five Angstroms thick. The thicknesses of such films may not be determinable using conventional Raman spectroscopy or SERS. Further, variations in thickness may be determined. Thus, use of the method 150 may enhance the ability to study and diagnose issues with carbon layers on sliders, disks or in other contexts within magnetic recording disk drives.

I claim:

1. A method for interrogating a thickness of a carbon layer residing on at least one of a magnetic recording head and a magnetic recording disk, the method comprising:
providing an enhancement film on the carbon layer, the enhancement film being continuous across a portion of the carbon layer;
exposing the enhancement film to light from a light source, the enhancement film residing between the light source and the carbon layer;
detecting scattered light from the carbon layer to provide a surface enhanced Raman spectroscopy (SERS) spectrum; and
determining the thickness of the carbon layer based on the SERS spectrum.

2. The method of claim 1 wherein the carbon layer is a carbon overcoat layer.

3. The method of claim 2 wherein the carbon overcoat layer includes at least one of a diamond-like carbon and a nitride carbon.

4. The method of claim 1 wherein the step of providing the enhancement film further includes:
depositing at least one of Au, Ag, Pd, Rh, Li, Na, and Pt.

5. The method of claim 4 wherein the enhancement film has a thickness of not more than forty nanometers.

6. The method of claim 5 wherein the thickness of not more than twelve nanometers.

7. The method of claim 4 wherein the enhancement film has a thickness of at least one nanometers.

8. The method of claim 7 wherein the thickness of at least five nanometers.

9. The method of claim 1 wherein the carbon layer resides on a slider including the magnetic recording head.

10. The method of claim 9 wherein the magnetic head includes a writer shield and wherein the carbon layer resides on the writer shield.

11. The method of claim 1 wherein the carbon layer has a thickness of not more than 150 Angstroms.

12. The method of claim 11 wherein the thickness is not more than twenty-five Angstroms.

13. The method of claim 11 wherein the carbon layer has a thickness of not more than ten Angstroms.

14. The method of claim 11 wherein the carbon layer has a thickness of not more than five Angstroms.

15. The method of claim 9 wherein the magnetic head includes an insulating layer and wherein the carbon layer resides on the insulating layer.

16. The method of claim 1 wherein the step of exposing the enhancement film further includes:
  attenuating an intensity of the light source such that the enhancement film remains continuous throughout the step of exposing the enhancement film.

17. The method of claim 1 wherein the light source includes at least one of a 514 nm laser, a 532 nm laser and a 784 nm laser.

18. A method for interrogating a thickness of a carbon overcoat layer residing on at least one of a slider and a magnetic recording disk, the carbon overcoat layer having a thickness of not more than twenty-five Angstroms, the method comprising:
  providing an enhancement film on the carbon overcoat layer, the enhancement film being continuous across a portion of the carbon overcoat layer and having a thickness of not more than twelve nanometers and not less than five nanometers, the enhancement film including at least one of Au, Ag, Pd, Rh, Li, Na, and Pt;
  exposing the enhancement film to light from a laser, the enhancement film residing between the laser and the carbon overcoat layer, the intensity of the light incident on the enhancement film being insufficient to melt the enhancement film during the exposing;
  detecting scattered light from the carbon overcoat layer to provide a surface enhanced Raman spectroscopy (SERS) spectrum; and
  determining the thickness of the carbon overcoat layer based on the SERS spectrum.

19. A method for interrogating a thickness of a carbon layer residing on at least one of a slider and a magnetic recording disk, the carbon layer having a thickness of not more than twenty-five Angstroms, the method comprising:
  providing an enhancement film on the carbon layer, the enhancement film being continuous across a portion of the carbon layer and including at least one of Au, Ag, Pd, Rh, Li, Na, and Pt;
  performing surface enhanced Raman spectroscopy (SERS) on the carbon layer using a light source, the enhancement film residing between the carbon layer and the light source;
  determining the thickness of the carbon layer based on the SERS.

* * * * *